2,830,904

BREWING PROCESS

Holger Arentoft and Hildegard Arentoft, Stuttgart, and Alexander Mollering, Hacklingen, uber Luneburg, Germany, assignors to Lüneburger Kronenbrauerei A. G. zu Lüneburg, Luneburg, Germany No Drawing. Application January 18, 1954
Serial No. 404,778

Claims priority, application Germany April 27, 1953

5 Claims. (Cl. 99—50.5)

This invention relates to a brewing process, and more particularly to a process which utilizes ultrasonic or sonic energy for the extraction of hop into water, wort or other fluids.

It has already been proposed to use the generally known dispersing and dissolving properties of sonic energy for obtaining a better extraction of the hop bitter substances. The economic importance of such methods is obviously very considerable, since these methods promise hop savings of 20–30%. However, none of the already known methods have hitherto proved successful, although the bitter substances of the hop were extracted exactly in the proportions claimed. The finished beer did not taste as well as the corresponding normal beer. The more hop was saved, the more stale and dull the beer tasted. The experts have then realized that the aromatic hop substances apparently can not endure the simultaneous effects of sonic agitation and high temperature. The majority of the substances which form the beer flavor is present in hop oil, which consists of a sesquiterpene, the humulene (B. P. 509° F.), a terpene, the mycrene (B. P. 332° F.) and of several fragrant substances, such as geraniol (B. P. 447° F.), linaliol (B. P. 398° F.) etc. Although these aromatic substances have throughout high boiling points, they volatilize quickly at temperatures above approx. 160° F., since all of them volatilize when water vaporizes. It is known that merely 5–10% of the hop oil is present in the finished beer. A study of the boiling of water in an ultrasonic energy field shows clearly why the boiling of hop under the influence of ultrasonic energy leads inevitably to far higher losses of hop oil than is the case in the normal boiling process. The relatively large steam bubbles which form during normal boiling atomize in an ultrasonic energy field into a milky cloud consisting of millions of smallest bubbles, each of them tearing some hop oil molecules away. Thus, the fragrant substances leave first then the mycrene and the humulene.

A second disadvantage of the already known sonic extraction methods consists in that the break is defective. "Break" is a special term for designating the irreversible precipitation of nitrogenous wort constituents, which precipitation takes place during the boiling of wort. The perfection of the break is decisive for the degree of clarification, and has a far-reaching importance for the further development of the beer, as to its taste, maturity, appearance and colloidal stability. The break is a joining of proteins and hop tannins. The protein coagulation thus formed is the result of adsorption combinations which obey the law of adsorption balance. Therefore, the coagulation process depends on the relative amounts of protein and tannin available. In order to get an optimal precipitation of protein, it is necessary to extract all tannin from the hop and to represent it in such a consistency as to secure a direct and immediate effect. The tannins are easily soluble in hot water and almost insoluble in cold water. When extracting the hop bitter substances in an ultrasonic energy field, the temperature at which extraction takes place must, therefore, be as high as possible. Otherwise the extract would not contain enough tannin for precipitation. However, at high temperatures the aromatic substances will be destroyed as described above. At lower temperatures (an already proposed ultrasonic hop extracting method works at 120° F.), there will not be extracted enough tannin.

In another known hop extraction method the ultrasonic energy field is located within the brew kettle during the boiling of wort. By this method there will be extracted at least the same amount of tannin as during the normal procedure. However, the particles of coagulating protein are atomized in the ultrasonic energy field and emulsified to a large degree with the wort, causing the finished beer to have a characteristically dull, breadlike taste and an inclination to milkiness and saddening.

It is generally known that the coagulation of protein is released not by tannin in its original state but by an oxidation product, the so-called phlobaphene. The tannin which has not already been oxidized into phlobaphene and taken part in the coagulation process during the boiling of wort is oxidized later to an essential extent, and, thus, causes low-temperature and pasteurization saddenings. In the normal production of the "Pilsener"-type beer, a part of the hop is added to the wort just before the end of the boiling process (and consequently after the protein coagulation), in order to increase the flavor of the beer. The tannin contained in this part of the hop is, of course, lost for precipitation. However, some of this tannin is present in the wort and consequently causes saddenings. That's why even such high-quality beers are subject to saddenings, as it is generally known in brewing practice.

The invention has the purpose of removing the above named disadvantages. According to the invention, the hop is first extracted in water or wort at a temperature not above 95° F. This "cold" hop extract contains practically all hop oil after a sonic agitation of 2½–3 hours. (Frequency 800 kilocycles, 6 watts/sq. in. It will be noted that the performance 6 watts/sq. in. is the average performance measured over the total cross-section of the extraction container.) Consequently, the "cold" extract contains almost all aromatic substances which will later be found in the beer. Only a scant part of the beer aroma arises from the humulon and the isohumulon. On the other hand, the "cold" hop extract contains merely a few bitter substances and very little tannin.

The "cold" extract is separated from the hop husks which are pressed and centrifuged, and then sparged with water. Since the hop husks are extracted twice, they are called "spent hop" only after the second extraction. The hop husks are extracted the second time in water or in wort, normally at boiling temperature, and at any rate at temperatures above 140° F. The "warm" extract contains after a sound treatment of approximately 2 hours at 212° F. (6 watts/sq. in. average 800 kilocycles) 80–90% of the total amount of the hop bitter substances. Moreover, it contains almost all the tannin which has already been oxidized into phlobaphene during the sound treatment.

Since the spent hop contains still a considerable amount of extract even after careful separation, it is poured into the brew kettle directly after the "warm" extraction process. The "cold" extract is added to the wort in the hot-beer tank or in the settling tank, or to the green beer in the fermenting tank (after the low kraeusen) or in the lagering tank, preferably at the beginning of the lagering process. The "warm" extract is added to the wort in the brew kettle approx. one hour after the beginning of boiling.

In order to produce hop concentrates, the dual "cold" and "warm" extraction of hop can be carried out in other liquids, e. g. ether or alcohol. These liquids are evaporated after extraction, leaving the pure hop concentrates behind. In this manner there is obtained a concentrate containing the bitter substances and the tannin (phlobaphene) which is to be added to the boiling wort in the same manner as described for the "warm" extract, and an other concentrate containing the aromatic substances which is to be added to the wort in the settling tank or to the green beer in the fermenting tank or in the lagering tank. This procedure has the advantage of a large hop saving and of a protection and preserving of the aromatic hop substances, as described above.

By the "cold" extraction of the hop the sensitive aromatic hop oils are protected. It is important to prevent oxidations during the sound treatment; therefore, the extraction container must be filled with $CO_2$. Also the separate tank in which the "cold" extract is stored until it is added to the wort or to the green beer must be filled with $CO_2$ and cooled down to 35–40° F.

On the other hand, oxidation is wanted during the "warm" extraction. It is generally known that an ultrasonic energy field accelerates very much oxidation processes. During the "warm" extraction, a strong ultrasonic energy field is able to change all hop tannin into phlobaphene. Hitherto it was not certain if an artificial increase of the redox potential, e. g. by leading oxygen into the extraction container, would not disadvantageously influence the taste of the finished beer. By the present method it has been proved that by the "warm" extraction in contact with atmospheric air the beer is given a fine bitter taste identical with the bitter taste of normal beer.

A long series of taste experiments has shown that the bitter taste has exactly the same quality when the extraction rate is rising. The idea that the lupulon has no bitter value is thus so far refuted as there must be at least assumed a thoroughly changing of lupulon into the soluble and strongly bittering beta-soft-resin, an oxidation product which according to several experts has a greater bitter value than the alpha-hop-bitter and its soft isomeric product, the isohumulon.

By the process according to the invention can be thus extracted almost all bitter substances from hop when an adequate ultrasonic performance is available. In experiments an extraction percentage of more than 90 has been attained. In practical brewing according to the invention there has been reached a percentage of 65%.

The highest hop saving rate is 70–75%. A beer brewed according to the above described method will, therefore, need only 25–30% of the normal hop addition to get the same bitter value as the corresponding normal beer. However, it contains more aromatic substances than the normal beer, since the latter contains at the most 5–10% of the total aromatic substances existing in the added hop. The rest is volatilized and damaged during boiling. The "cold" extract contains 90–100% of the total amount of aromatic substances. Since the amount of hop added in normal practice is 3–4 times as large as that of the hop added when proceeding according to the invention, the "cold" extract contains 25–30% of the total amount available in the normal hop addition, i. e. the "cold" extract, and thus also the beer produced according to the invention, contains 3–4 times the amount of aromatic substances of the normal beer.

However, it must be realized that the water-vapor volatility of the aromatic substances also leads to losses during fermentation, especially during the period of low kraeusen. In this phase one can smell the hop flavor at the fermenting tank. This fragrance disappears during the high kraeusen, probably because the foam prevents the hop oils from escaping. It is important to apply a slow and cold fermentation process, in order to keep the losses of aroma substance as small as possible. The "cold" extract can be added either after the low kraeusen or after the fermenting in the lagering tank. In these cases, it must be cautiously pasteurized by heating it under $CO_2$ until 150° F. for 30 minutes. When the "cold" extract is added in the hot-beer tank or in the settling tank, it can expeditiously be added at the moment when the temperature of the wort has dropped to 155° F. Then the pasteurization takes place automatically.

It has already been said that the process according to the invention ensures an almost perfect coagulation and precipitation of nitrogenous wort constituents (the so-called "break") during the boiling of wort in the brew kettle. The hop tannins which have been extracted during the "warm" extraction phase have also already been oxidized to phlobaphene during this phase. Examinations have shown that the total amount of available hop tannin will be oxidized to phlobaphene by using an adequate ultrasonic energy performance, approx. 6 watts/sq. in. on the total cross section of the extraction container. When the "warm" extract is added to the boiling wort, approx. one hour after the onset of boiling, it releases spontaneously the break and ensures a perfect clarification. However, it must be guaranteed that the pH be not lower than 5.2 when the "warm" extract is added. The clarification is so perfect that no saddenings can be any more observed.

A further advantage of the new process is the essential acceleration of maturing. The causes of this acceleration are still not known; they are supposed to have some connection with the perfect coagulation and precipitation of the nitrogenous constituents and the almost complete removal of tannins at this precipitation. A large-scale experiment (260 barrels) showed a decrease of the cellar processing (lagering process) of 50%. Decreases of 25–30% should be attained in any case, also after a very slow and cold fermenting (1 beer barrel=31 gallons= 1.173 hl.).

The carrying into practice of the brewing process according to the invention will be shown in the following example:

There shall be produced a 200-barrel brew of the "Pilsener"-type beer. In the normal brewing process 130 lbs. natural hop are used therefor. The hop is normally added to the wort in three portions: e. g. 50 lbs. when the wort is being filled into the brew kettle, 40 lbs. one hour after the beginning of boiling, and 40 lbs. 15 minutes before the "knocking out" of the wort ("knocking out" means that the wort is pumped from the brew kettle into the hot-beer tank). The ratio of extraction by this process will be approx. 25%, i. e. the average amount of hop bitter substances extracted solely by boiling is 25% of the total bitter content of the hop.

The ultrasonic extracting device has an average performance of 6 watts/sq. in. (measured over the entire cross-section of the container) and a frequency of 800 kilocycles. By means of pre-examinations, the ratio of extraction is determined to be 65%. The ratio of hop savings is then calculated at 62% of the normal hop addition. Consequently, the new process claims 38% of the normal hop addition, i. e. 50½ lbs. instead of 133 lbs.

The 50½ lbs. hop are poured into the extracting tank and mixed with distilled water (or brew water) in a suspension ratio of 1:20 (by weight). The extraction container is closed and filled with $CO_2$. Ultrasonic energy is switched on. The sound treatment will last 3–4 hours with the performance described above. The hop suspension must be stirred slowly. The temperature must not exceed 95° F. To prevent any increase of temperature, the extraction tank must be furnished with a water cooling device. The most advantageous temperature is between 85°–95° F. The filling in of $CO_2$ must not lead to any overpressure, because the cavitation effect of the ultrasonic activity would otherwise be affected. It has still not been established whether a vacuum in the extracting tank would be advantageous.

When the "cold" extraction phase has been finished, the "cold" extract is separated from the hop husks (the designation "spent hop" will be used only for the hop residues after the "warm" extraction, since the hop is only then "spent"). The separation is effected by means of a press or a centrifuge installed in the extraction container, since the hop husks retain 6–7 times their own weight in "cold" extract (approx. one third of the entire amount of extract), which otherwise would be damaged by the following "warm" extraction. The husks will also be sparged by distilled water. The "cold" extract and the sparging water are pumped into a separate tank where the extract is covered by $CO_2$ and waits to be added to the wort or to the green beer.

The hop husks are again mixed with distilled water (ratio 1:20), and the ultrasonic energy field is switched on. This time, the oxygen of the atmosphere has free access to the suspension. The use of artificially supplied oxygen or ozone has not yet been examined thoroughly enough for being discussed. The temperature is raised to 212° C. It has proved to be advantageous to close the container and to subsequently raise the pressure to 1.3–1.4 atmospheres (19–20½ lbs./sq. in.; temperature approx. 250° F.). This pressure raising does not change the ultrasonic cavitation effect, since the interior vapor pressure of the liquid balances with the surface pressure.

The "warm" extraction lasts 2–2½ hours, according to the described ultrasonic performance. Then the "warm" extract is separated from the spent hop which at once is added to the wort in the brew kettle. When the "cold" extraction has been started at the same time that the wort was pumped into the brew kettle, it will now be seen from the mentioned length of the individual extraction phases that the wort will approach the boiling point almost concurrently with the completion of the "warm" extraction. Carefully calculated time schedules prove that the completion of the "warm" extraction will normally take place about one hour before the wort reaches the boiling point.

One hour after the onset of boiling, the "warm" extract is added to the boiling wort. A few minutes later (heretofore always 3–4 minutes) the break acceleration appears spontaneously, as an abundance of very large flakes.

After knocking-out, the wort is pumped into the hot-beer tank (settling tank). Then the decrease in temperature must be observed. At approx. 155° F., the "cold" extract is added cautiously such that the extract is slowly distributed under the surface of the wort.

The "cold" extract can also be pasteurized in the separate tank (under $CO_2$), by heating the extract to 150°–160° F. for 30 minutes. Then the extract can be added to the wort in the fermenting tank (after the low-kraeusen phase), or to the green beer in the lagering tank directly after the main fermenting.

An important secondary effect of the brewing process according to the invention is that the ultrasonic-treated beer does not lose any tasting value in pasteurization. Through the perfect coagulation and precipitation of proteins (the "break"), almost all tannin has been removed from the wort. When some tannin should not have been engaged in precipitation, it will at any rate have been oxidized into phlobaphene during the "warm" extraction phase. Thus, it will at least participate in the precipitations in the settling tank or in the fermenting tank. This fact prevents oxidations during the lagering period and at filling, because the redox system of the beer has been stabilized. It is said to have been "burdened," i. e. it will put a strong resistance up to any reducing or oxidizing potential trying to affect its state of balance.

Therefore, beer produced in accordance with the invention can be pasteurized by heating it to 155° F. for 30 minutes, without oxidation of tannin, simply because the beer contains no more free tannin. Certainly, some hop oil will be oxidized at the surface of the beer in the bottle, but these losses are scant and can scarcely be tasted because of the redox system's resistance against oxidation. When measuring the redox potential before and after pasteurization, e. g. by an ITT measurement, it will be found that the redox potential of normal beer is raised with 3–4 units by pasteurization; the redox potential of ultrasonic-treated beer will be raised with only one unit.

Finally, it must be mentioned that at the present technical stage of sound generators the infra-sonic energy does not suffice for "cold" extraction. This field of application will, for the present, remain reserved to the ultrasonic energy of high frequencies. However, the "warm" extraction can be carried out by means of infra-sonic energy.

Having thus described our invention, what we claim as new and desire to secure by Letters Patent is:

1. In a brewing process, the steps of subjecting hops in a cold aqueous liquid at a temperature not exceeding 95° F. to ultrasonic energy thereby partially extracting said hops and forming a cold extract solution; separating the partially extracted hops from the thus-obtained cold extract solution; subjecting said partially extracted hops in a warm aqueous liquid at a temperature exceeding 150° F. to ultrasonic energy thereby further extracting said partially extracted hops and forming a warm extract solution; separating the spent hops from the thus-obtained warm extract solution; forming a first boiling mixture of said spent hops and wort; forming a second boiling mixture of said thus-obtained warm extract solution and said first boiling mixture after the same has boiled for approximately one hour; cooling said second boiling mixture; and forming a third mixture of said thus-obtained cold extract solution and said second mixture after the temperature thereof has dropped to approximately 160° F.

2. In a brewing process, the steps of subjecting hops in a cold aqueous liquid at a temperature not exceeding 95° F. to ultrasonic energy thereby partially extracting said hops and forming a cold extract solution; separating the partially extracted hops from the thus-obtained cold extract solution; subjecting said partially extracted hops in a warm aqueous liquid at a temperature exceeding 150° F. to ultrasonic energy thereby further extracting said partially extracted hops and forming a warm extract solution; separating the spent hops from the thus-obtained warm extract solution; forming a first boiling mixture of said spent hops and wort; forming a second boiling mixture of said thus-obtained warm extract solution and said first boiling mixture after the same has boiled for approximately one hour; cooling said second boiling mixture; and forming a third mixture of said thus-obtained cold extract solution and said second mixture when the temperature thereof has dropped to approximately 160° F.

3. In a brewing process, the steps of subjecting hops in a cold aqueous liquid at a temperature not exceeding 95° F. to ultrasonic energy thereby partially extracting said hops and forming a cold extract solution; separating the partially extracted hops from the thus-obtained cold extract solution; subjecting said partially extracted hops in a warm aqueous liquid at a temperature exceeding 150° F. to ultrasonic energy thereby further extracting said partially extracted hops and forming a warm extract solution; separating the spent hops from the thus-obtained warm extract solution; forming a first boiling mixture of said spent hops and wort; forming a second boiling mixture of said thus-obtained warm extract solution and said first boiling mixture after the same has boiled for approximately one hour; cooling said second boiling mixture; fermenting the cooled second mixture; and forming a third mixture of said thus-obtained cold extract solution and the fermented second mixture.

4. In a brewing process, the steps of subjecting hops in a cold aqueous liquid at a temperature not exceeding 95° F. to ultrasonic energy thereby partially extracting said hops and forming a cold extract solution; separating the partially extracted hops from the thus-obtained cold extract solution; subjecting said partially extracted hops in a warm aqueous liquid at a temperature exceeding 150° F. to ultrasonic energy thereby further extracting said partially extracted hops and forming a warm extract solution; separating the spent hops from the thus-obtained warm extract solution; forming a first boiling mixture of said spent hops and wort; forming a second boiling mixture of said thus-obtained warm extract solution and said first boiling mixture after the same has boiled for approximately one hour; cooling said second boiling mixture; fermenting the cooled second mixture until the same is converted into green beer and forming a third mixture of said-thus obtained cold extract solution and the green beer.

5. In a brewing process, the steps of subjecting hops containing oils to be treated by ultrasonic energy at temperatures not exceeding 95° F. and tanning agents and bitters substantially insoluble at temperatures not exceeding 95° F. and readily soluble at temperatures exceeding 150° F. in a cold aqueous liquid at a temperature not exceeding 95° F. to ultrasonic energy thereby extracting substantially all of said oils from said hops while retaining therein substantially all of said tanning agents and bitters and forming a cold extract solution containing oils and substantially free from tanning agents and bitters; separating the partially extracted hops from the thus-obtained cold extract solution; subjecting said partially extracted hops in a warm aqueous liquid at a temperature exceeding 150° F. to ultrasonic energy thereby extracting the remainder of said oils, tanning agents and bitters from said hops and forming a warm extract solution containing tanning agents and bitters while substantially free from oils; separating the spent hops from the thus-obtained warm extract solution; forming a first boiling mixture of said spent hops and wort; forming a second boiling mixture of said thus-obtained warm extract solution and said first boiling mixture after the same has boiled for approximately one hour; cooling said second boiling mixture; and forming a third mixture of said thus-obtained cold extract solution and said second mixture after the temperature thereof has dropped to approximately 160° F.

References Cited in the file of this patent

The Influence of Ultrasound Waves on Yeast. H. von Euler Bol. Skarzynski, Naturwissenschafen, 31, No. 33/34:389 (1943); abstract in Wallerstein Laboratories Communications No. 22:226.

Wallerstein Laboratories Communications No. 24:139, August 1945, vol. VIII.

Wallerstein Laboratories Communications No. 25: page 194–199, December 1945, vol. VIII.

Wallerstein Laboratories Communications No. 28:237, abstract of J. Bact. 51, No. 4:487 (1946).

Ultraschall in der Brauerei (Supersonics in the Brewery) by C. Enders and K. Raible, pub. in Brauwissenschaft, No. 3: 33–37 (1951); abstract in Wallerstein Laboratories Communications No. 45:143.

Bitterstoff durch Ultraschall, ein Verfahren zur rationellen Hopfung des Bieres (Bitter Material through Ultrasonics. A Process for the Economical Hopping of Beer), by W. Specht., pub. in Brauwelt No. 11B: 200–203, 1951; abstract in Wallerstein Laboratory Communications 46–256.